No. 872,759. PATENTED DEC. 3, 1907.
J. H. SCHONEBERGER & G. W. FRAZIER.
ELECTROLYTIC SHIP BOTTOM PROTECTOR.
APPLICATION FILED SEPT. 14, 1906. RENEWED OCT. 9, 1907.

Witnesses
Richard C. Balinger.
Burton Macafee.

Inventors
John H. Schoneberger.
George W. Frazier.
By Edwin Guthrie,
Attorney

UNITED STATES PATENT OFFICE.

JOHN H. SCHONEBERGER AND GEORGE W. FRAZIER, OF ALLEGHENY, PENNSYLVANIA, ASSIGNORS TO PITTSBURGH ELECTROLYTIC MANUFACTURING COMPANY, A CORPORATION OF PENNSYLVANIA.

ELECTROLYTIC SHIP-BOTTOM PROTECTOR.

No. 872,759.   Specification of Letters Patent.   Patented Dec. 3, 1907.

Application filed September 14, 1906, Serial No. 334,584. Renewed October 9, 1907. Serial No. 396,664.

*To all whom it may concern:*

Be it known that we, JOHN H. SCHONEBERGER and GEORGE W. FRAZIER, citizens of the United States, residing at Allegheny, in the county of Allegheny and State of Pennsylvania, have invented certain new and useful Improvements in Electrolytic Ship-Bottom Protectors, of which the following is a specification.

Our invention relates to electrolytic ship-bottom protectors, and has for its object the production and arrangement of certain electro-chemically related elements whereby the electrolysis of sea water is effected continuously, and the submerged, unpainted metal of a vessel is gradually coated with a more or less adherent layer of hydrogen and sodium hydrate, and thereby protected from the ordinary attacks of vegetable, barnacles, molluscous or insect parasites.

By the use of our invention the sheathing of a vessel need not be painted or otherwise coated externally as a means of protection, and the vessel need not be docked.

Figure 1:
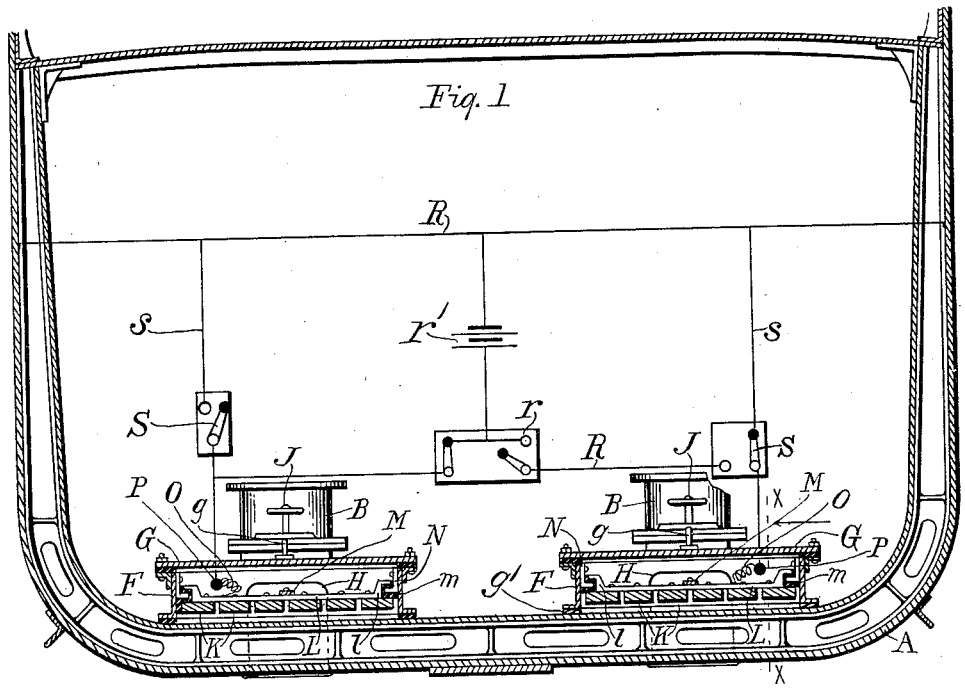
Figure 2:
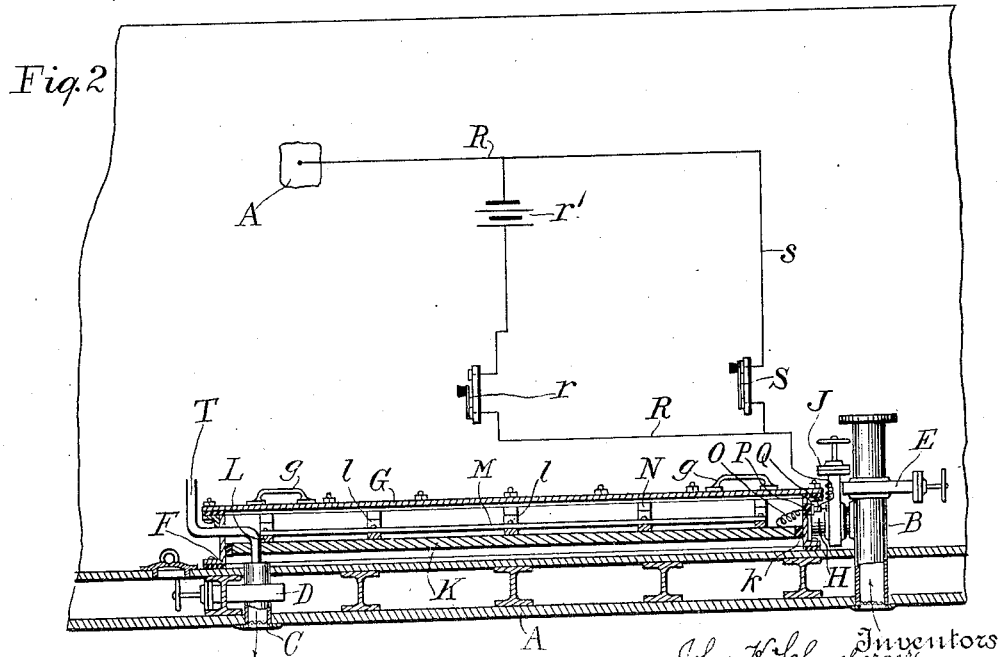

We accomplish the object stated by fashioning and associating the essential parts in one form of our invention as illustrated in the accompanying drawings, of which Figure 1 represents the cross-section of a vessel with our invention also shown in cross-section, applied, and Fig. 2 is a vertical section showing a portion of a vessel and a longitudinal section of our invention therein.

Like letters of reference designate the same parts throughout the specification and drawings.

Considering Fig. 1 of the drawings, the vessel is designated by the letter A. An indirect pipe B and direct pipe C open through the bottom of the vessel to the sea. The pipe C includes the sea-cock D, as shown in Fig. 2, and the pipe B has the valve E. Both pipes afford communication from the interior of box F with the outside sea water. The box is placed inside the vessel, preferably upon the bottom, and it is covered by a removable top G. The box may or may not have a bottom of its own, $g'$.

The letter H refers to the pipe which couples pipe B and box F, and pipe H includes the valve J by which the box may be cut off and still permit the employment of pipe D as an inlet for sea water.

Electrodes K, of any number, form or size, are arranged within the box F. Each electrode may be a bar of zinc having end insulators $k$, and being joined together by the cross-bars L having the end-hooks $l$ and the longitudinal bar M. The combined electrodes are supported upon the brackets N by the engagement of the ends $l$ of cross-bars L, and direct metallic contact is prevented by introducing any suitable insulation $m$. All parts within the box that are intended to be free from electrical or chemical attack are protected in the usual way by impervious varnish which it is not necessary to show. The cross-bars L and longitudinal bars M and the brackets N are thus protected. The bars L and M serve to bind the several electrodes into one.

A conductor O leads from the electrodes K by way of the insulating plug P in the end wall of the box, to the binding post Q on the exterior. The continuation of the conductor is marked R and it includes a switch $r$ and a source of current electricity $r'$, hereafter mentioned. The end of conductor R is in electrical connection with the outside metal skin of the ship. In the drawings there is shown also shunt or extra circuits one of which takes in a switch designated by the letter S. The conductors of the extra circuits are marked $s$.

The operation of our invention may be carried out in either of several ways. It will be noted that by means of the switches $r$ and S, the electrodes K in either box may be connected with the conductor R independent of battery $r'$, or, both sets of electrodes in both boxes may be so connected. Correspondingly, either or both sets of electrodes K may be circuited with the battery. In the former case, without a source of electricity, the electrodes are composed of zinc, which with the interior of the boxes form galvanic couples, the sea water being electrolyte. Decomposition due to the current created is found to gradually coat the inside of the box with hydrogen and caustic soda, and that, when communication with the sea and the inside of boxes F is kept open, the progress of the ship causes a circulation of water through the box F in the direction of the arrows, and the caustic soda surface creeps or extends gradually outside the vessel upon the external metal plates which together constitute, as stated, the positive plate of the galvanic couple. The deposit occurs first within the box, because the box is necessarily connected with the metal of the ship and, consequently, with the outside plates. The interior of the box being the nearest metal to the zinc, is as stated, first coated, and it is desirable that it should be so, in order that no growth of any sort may become fixed within the box and retard the free passage of the water through the box. The coating is found to almost if not wholly prevent all growths as stated.

It will be understood that the pipe B at the right in Fig. 2 is located toward the forward part of the ship, and the pipe C toward the after part, and, when the ship moves forward at reduced speed a gradual inflow and outflow take place by way of those pipes.

Obviously, when the vessel is at rest no circulation through the box occurs and the coating extends itself with less certainty and rapidity. Where necessary, therefore, we set up an artificial circulation through the box by means of the steam jet T, and the natural tide or current movement of all waters perfects the distribution.

Let it be assumed that it is not convenient, economical or desirable to employ zinc electrodes. The same effect may be produced by including the battery and forming the electrodes of some non-oxidable metal or conducting material which may be readily substituted for the zincs in the same casing. The operation is precisely the same.

Having now described our invention, and explained the mode of its operation, what we claim is.—

1. In an electrolytic ship-bottom protector, the combination with a casing in communication with the sea water, of an electrode within the casing and insulated from it, and a conductor connected with the electrode and passing out of the casing, the said conductor being insulated from the casing and having its end connected with the skin of the vessel, the said casing being secured to the vessel.

2. In an electrolytic ship-bottom protector, the combination with a casing in communication with the sea water, of an electrode within the casing and insulated from it, and a conductor connected with the electrode and passing out of the casing, the said conductor being insulated from the casing and having its end connected with the skin of the vessel, the said casing being secured within the vessel.

3. In an electrolytic ship-bottom protector, the combination with a casing in communication with the sea water, of an electrode within the casing and insulated from it, a conductor connected with the electrode and passing out of the casing, the said conductor being insulated from the casing and having its end connected with the skin of the vessel, and means whereby the external sea water may be caused to flow through the casing.

4. In an electrolytic ship-bottom protector, the combination with a casing in communication with the sea water, of an electrode within the casing and insulated from it, a conductor connected with the electrode and passing out of the casing, the said conductor being insulated from the casing and having its end connected with the skin of the vessel, the said casing being secured within the vessel, and means whereby the external sea water may be caused to flow through the casing.

5. In an electrolytic ship-bottom protector, the combination with a casing having two openings one forward of the other in communication with the sea water, of an electrode within the casing and insulated from it, a conductor connected with the electrode and passing out of the casing, the said conductor being insulated from the casing and having its end connected with the skin of the vessel, the said casing being secured to the vessel.

6. In an electrolytic ship-bottom protector, the combination with a casing having two openings one forward of the other in communication with the sea water, of an electrode within the casing and insulated from it, a conductor connected with the electrode and passing out of the casing, the said conductor being insulated from the casing and having its end connected with the skin of the vessel, the said casing being secured within the vessel.

7. In an electrolytic ship-bottom protector, the combination with a casing having two openings one forward of the other in communication with the sea water, of an electrode within the casing and insulated from it, a conductor connected with the electrode and passing out of the casing, the said conductor being insulated from the casing and having its end connected with the skin of the vessel, and a source of current electricity, the said casing being secured to the vessel in a position whereby the progress of the vessel causes the sea water to flow through the casing.

8. In an electrolytic ship-bottom protector, the combination with a casing having two openings one forward of the other in communication with the sea water, of an electrode within the casing and insulated from it, a conductor connected with the electrode and passing out of the casing, the said conductor being insulated from the casing and having its end connected with the skin of the vessel, and a source of current electricity, the said casing being secured within the vessel in a position whereby the progress of the vessel causes the sea water to flow through the casing.

9. In an electrolytic ship-bottom protector, the combination with a casing in communication with the sea water, of an electrode within the casing and insulated from it; a conductor connected with the electrode and passing out of the casing, the said conductor being insulated from the casing and having its end connected with the skin of the vessel, a source of current electricity, and means whereby the external sea water may be caused to flow through the casing.

10. In an electrolytic ship-bottom protector, the combination with a casing in communication with the sea water, of an electrode within the casing and insulated from it, a conductor connected with the electrode and passing out of the casing, the said conductor being insulated from the casing and having its end connected with the skin of the vessel, a source of current electricity, the said casing being secured within the vessel, and means whereby the external sea water may be caused to flow through the casing.

In testimony whereof we affix our signatures in presence of two witnesses.

JOHN H. SCHONEBERGER.
GEORGE W. FRAZIER.

Witnesses:
FRANK H. McCARTHY,
D. E. LYON.